UNITED STATES PATENT OFFICE.

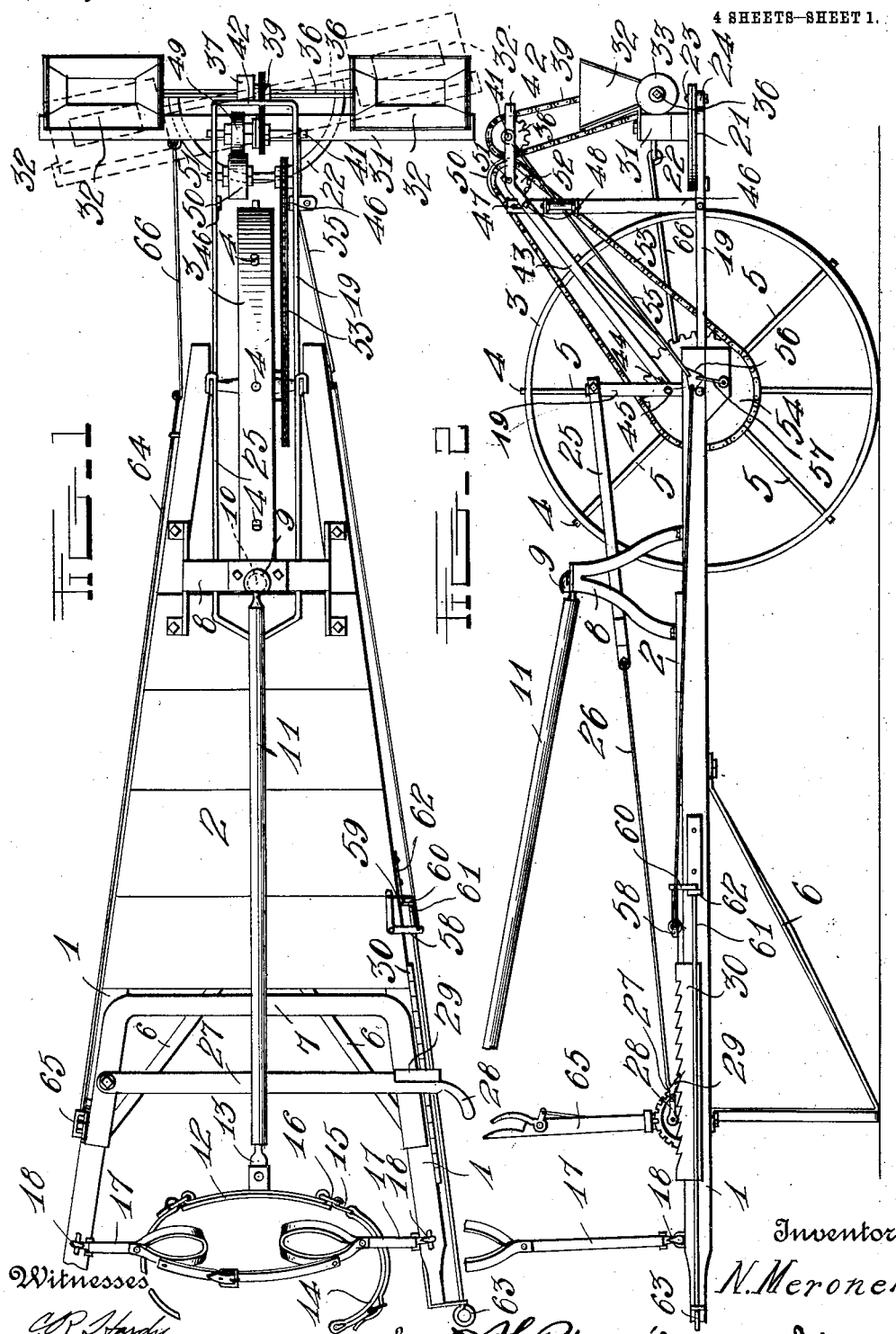

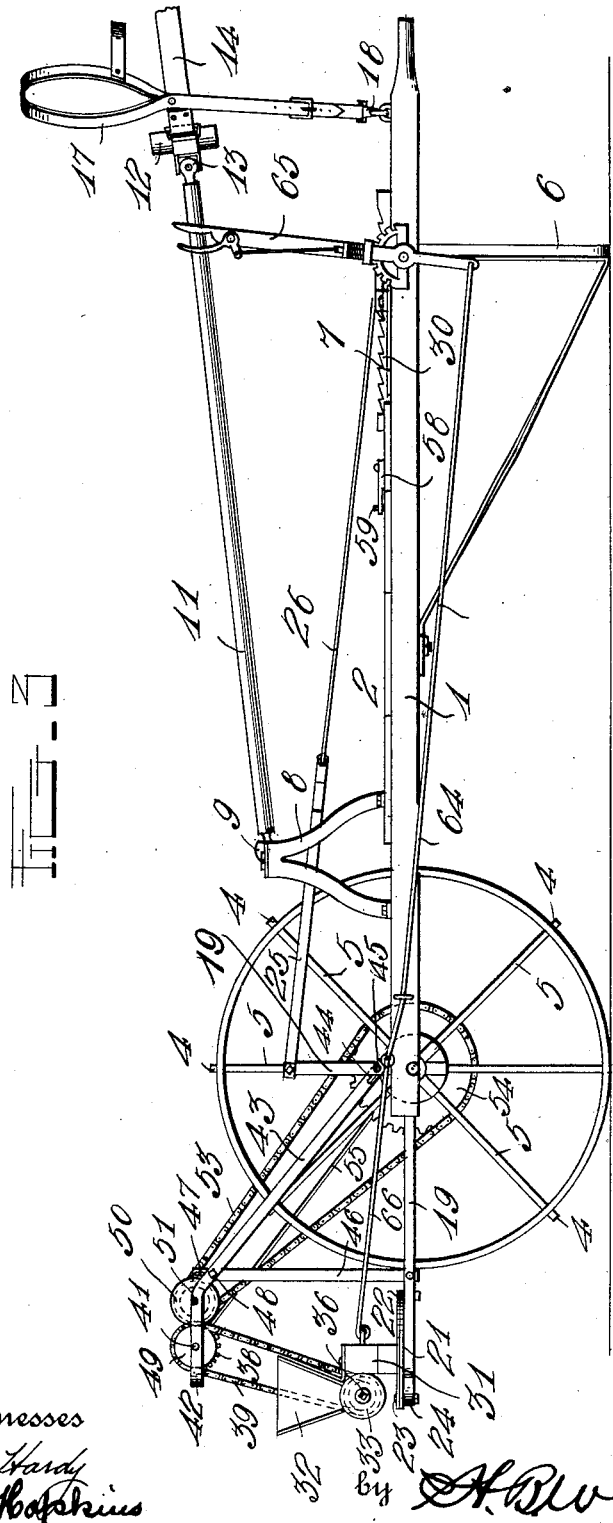

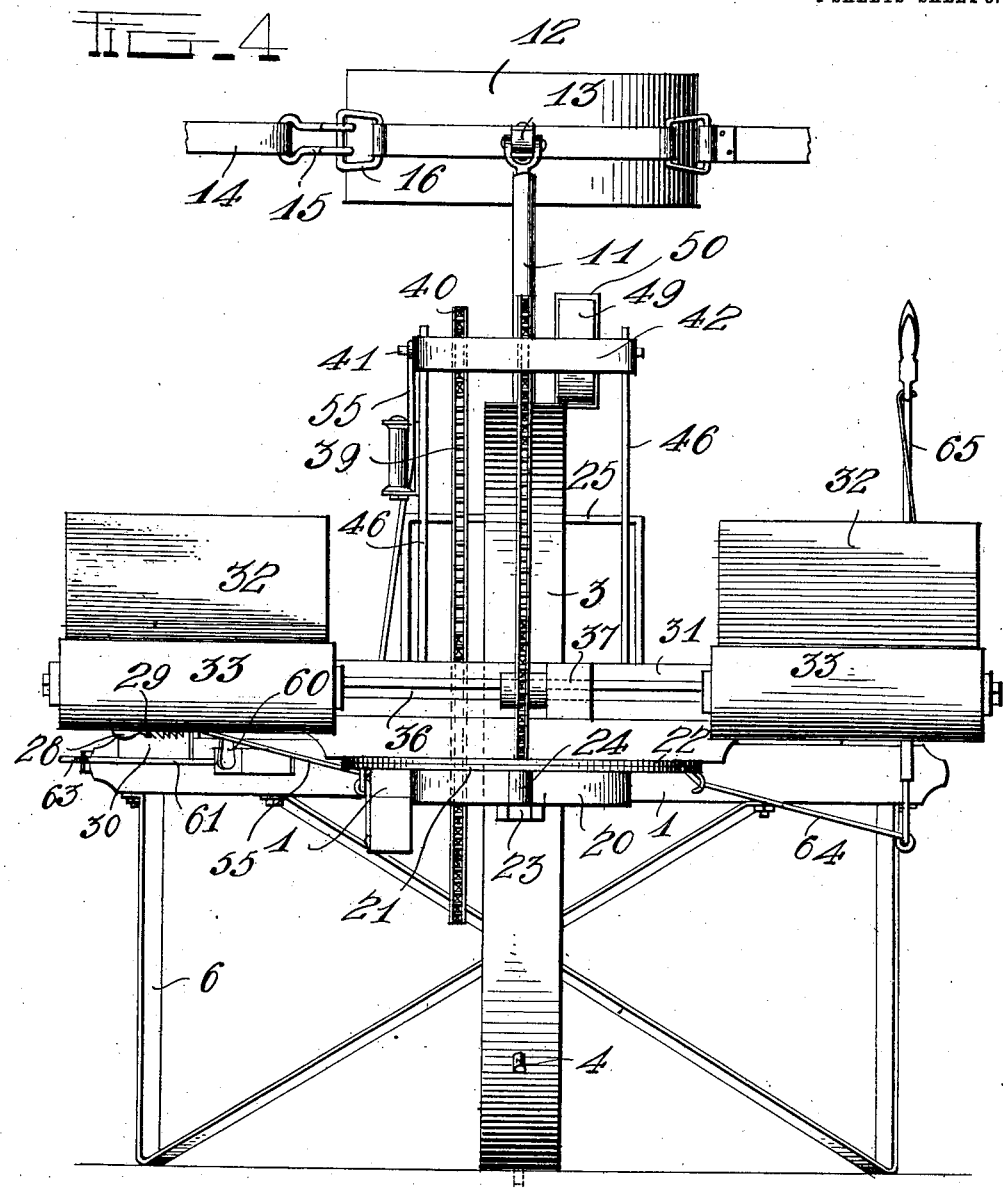

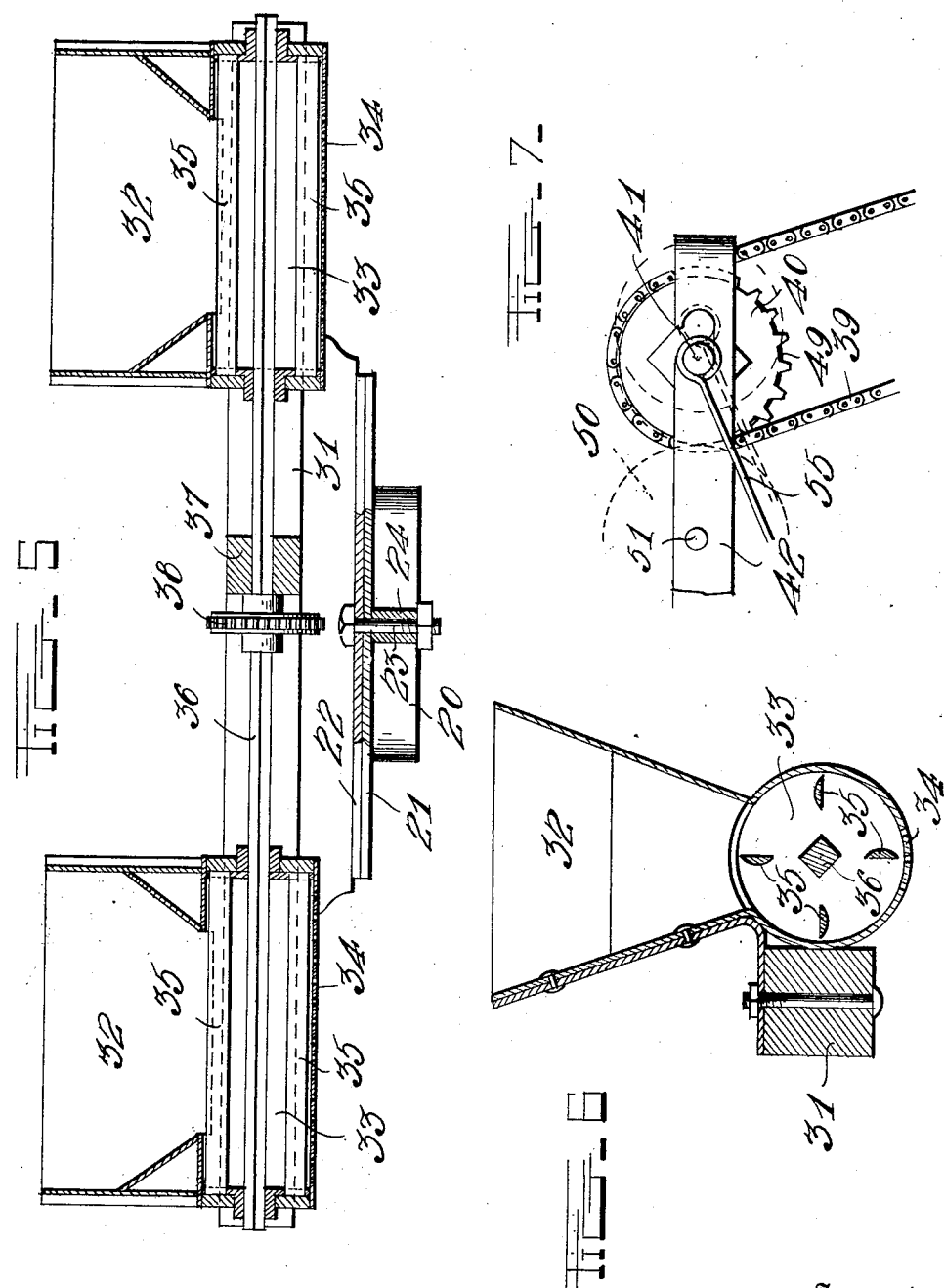

NICK MERONEK, OF POLONIA, WISCONSIN.

DISTRIBUTING-MACHINE.

998,107. Specification of Letters Patent. Patented July 18, 1911.

Application filed November 23, 1910. Serial No. 593,899.

*To all whom it may concern:*

Be it known that I, NICK MERONEK, a citizen of the United States, residing at Polonia, in the county of Portage and State of Wisconsin, have invented certain new and useful Improvements in Distributing-Machines; and I do declare the following to be a full, clear, and exact description of the invention, such as will enable others skilled in the art to which it appertains to make and use the same.

This invention relates to improvements in distributing machines.

One object of the invention is to provide a machine of this character which is particularly adapted for distributing land plaster or other forms of powdered insecticides on plants.

Another object is to provide a wheeled powder distributing machine having an improved construction of supporting and pushing mechanism whereby the rear end may be conveniently held up and the machine readily pushed forward.

A further object is to provide an improved powder distributing mechanism adapted to be swung around to different angles and having means whereby the same may be raised or lowered.

With these and other objects in view the invention consists of certain novel features of construction, combination and arrangement of parts as will be more fully described and particularly pointed out in the appended claims.

In the accompanying drawings: Figure 1 is a top plan view of my improved distributing machine showing the distributing mechanism in full lines in one position and in dotted lines in another position; Fig. 2 is a side view of one side of the machine; Fig. 3 is a similar view of the opposite side; Fig. 4 is a front end view; Fig. 5 is a central vertical longitudinal section through the distributing mechanism; Fig. 6 is a vertical cross section through one of the powder hoppers. Fig. 7 is an enlarged fragmentary side view of the driving mechanism for the powder distributing device showing the manner in which said mechanism is thrown into and out of gear.

In the embodiment illustrated, my improved distributing machine comprises a pair of handle bars 1 which diverge from their forward to their rear ends and are connected together midway between their ends by a platform 2. In the forward ends of the handle bars is revolubly mounted a supporting and operating wheel 3 having in its periphery a series of spurs 4 whereby the wheel will obtain a firm engagement with the ground when pushed along. Spurs 4 are here shown and are preferably formed from a continuation of the metal spokes 5 of the wheel, said spokes projecting through the rim, as shown. The handle bars are provided near their rear ends with suitable supporting legs 6, said legs being braced by inclined brace bars which extend forwardly and are crossed beneath the platform and connected at their forward ends to the opposite handle bars, as shown. The handle bars are further connected together near their rear ends by a curved bail-shaped angle iron connecting bar 7.

On the forward ends of the handle bars and platform is secured an upwardly projecting frame 8 in which is arranged a socket 9. With the socket 9 is engaged a bearing ball 10 which is secured to the forward end of a push bar 11 which extends rearwardly to the rear end of the machine and has connected to its rear end a breast plate 12. The plate 12 is connected to the rear end of the push bar by a universal joint 13 whereby said plate is free to move or swing in any direction on the end of the bar. The breastplate 12 is provided with an attaching strap 14 which is adapted to be passed around the body of the operator whereby the plate and rear end of the push bar is supported for operation. The strap 14 has in one end an adjustable loop whereby the length of the strap may be increased or diminished, and in said loop end is arranged a hook 15 which is adapted to be engaged with an eye or loop 16 secured to the adjacent end of the breast plate whereby the strap may be readily engaged with or removed from the body of the operator.

To the rear end of the handle bars are connected the lower ends of supporting shoulder straps or suspenders 17 whereby the rear end of the machine is supported from the shoulders of the operator thus permitting the hands to be disengaged from the handle bars and left free to operate the various adjusting levers hereinafter described. The lower ends of the shoulder straps 17 are preferably connected to the handle bars by means of snap hooks 18 whereby said straps may be readily removed when desired.

Arranged on the forward end of the machine is a powder distributing mechanism comprising a frame consisting of a pair of right angularly formed side bars 19 which are pivotally mounted on the axle of the supporting wheel 3 and are connected together near their outer ends by cross bars 20. On the connected forward ends of the side bars 19 is secured a lower member 21 of the fifth wheel, the upper member 22 of which is pivotally connected to the lower member and adapted to turn thereon by means of a pivot bolt 23 which extends through the forward portions of said members and through a bearing lug 24 formed on the front cross bar 20 of the frame.

The upwardly projecting rear ends of the side bars 19 have pivotally connected thereto the forward end of an adjusting yoke 25 the rear end of which is connected by a rod 26 to an adjusting lever 27 pivotally connected at one end to the bar 7 and to one of the handle bars, as shown. The lever 27 projects across the upper side of the rear end of the machine and has formed on its outer end a handle 28 and a fixed pawl 29 which is adapted to be engaged with a toothed rack or ratchet bar 30 secured to one side of the adjacent handle bar, as shown. By connecting the frame of the distributing mechanism to the lever 27 as herein shown and described, it will be readily seen that said frame may be raised or lowered and securely held in its adjusted position or at any desired distance above the ground.

Secured to the upper member 22 of the fifth wheel is a hopper supporting bar 31 to the forward sides of the outer ends of which are secured powder hoppers 32, on the lower ends of which are arranged distributing cylinders 33 having perforated bottoms 34 through which the powder is distributed. In the distributing cylinders 33 are arranged rotary agitating blades 35, said blades being secured to the opposite ends of an operating shaft 36 which is revolubly mounted in the edge of the cylinders and in a bearing block 37 secured to the hopper supporting bar 31.

On the shaft 36 is fixedly mounted a sprocket gear 38 which is connected by a sprocket chain 39 to a sprocket gear 40, fixedly mounted on a supporting shaft 41 journaled in a bearing frame 42 disposed above the bar 31 and connected at its inner end by inclined brace bars 43 which are preferably formed integral therewith and have formed in their rear ends slots 44 adapted to receive fastening bolts 45 whereby said rear ends of the brace bars are adjustably secured to the upwardly projecting inner ends of the side bars 19, as shown. The frame 42 is further supported by upwardly projecting bars 46 having in their upper ends slots 47 adapted to receive bolts 48 whereby said bars are adjustably connected to the frame 42.

Fixedly mounted on the shaft 41 is a friction gear or pulley 49 which is adapted to engage a similar gear 50 fixedly mounted on a counter-shaft 51 which is also revolubly mounted in the frame 42 and has fixedly mounted thereon a sprocket gear 52 which is connected by a sprocket chain 53 to the sprocket gear 54 fixed on the axle of the supporting wheel 3. By thus connecting the shaft 51 with the axle of the wheel 3, it will be readily seen that said shaft 51 will be driven in the proper direction when the machine is propelled or pushed along and that when the pulley or friction gear 49 on the shaft 41 is brought into engagement with the friction gear or pulley 50 on said shaft 51 that the movement of the latter shaft will be imparted to the shaft 41 through the same and the sprocket gear connecting said shaft 36 to the agitating blades, whereby the latter are revolved in the distributing cylinders to force the powder through the perforated bottoms thereof.

The shaft 41 is loosely mounted in the frame 42 and has one end in engagement with a bearing slot formed in one side of said frame. To this end of the shaft is connected the forward end of a shifting rod 55 which extends downwardly to the forward end of the handle bar on this side of the machine and at this point is formed therein a joint 56, said joint being connected to a retaining link 57 secured to this side of the machine. The rod 55 extends rearwardly from the joint 56 to a point near the rear end of the platform, where the rod is connected to one arm of a bell crank lever 58, pivotally mounted on the platform, as shown. The other arm of the bell crank lever is connected by a link 59 to a crank arm 60 formed on the inner end of a rock shaft 61 which is mounted in bearings 62 secured to the outer side of the adjacent handle bar, as shown. On the rear end of the rock shaft 61 is formed a handle loop 63 whereby the shaft may be rocked, thereby causing the crank on the forward end thereof to actuate the bell crank lever 58, thus causing the same to pull upon the shifting rod 55, which will draw the shaft 41 rearwardly or toward the shaft 51, thereby bringing the gear or friction pulley 49 into engagement with the pulley 50. When thus engaged the motion of the shaft 51 will be imparted to the agitator shaft 36, as hereinbefore described.

In order to swing the distributing mechanism around to different angles to facilitate the distribution of the powder, I provide an operating rod 64 which is slidably engaged with a guide bracket on the outer side of one of the handle bars and is connected at its rear end to an operating lever 65 pivoted on said handle bar and having a pawl and ratchet locking mechanism whereby the same is held in its adjusted position. The forward end of the operating rod 64 is connected by a link 66 to the hopper supporting bar 31 whereby when said rod is shifted said bar 31 and the hopper thereon will be swung in one direction or the other, thus bringing the hoppers in the desired position.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as defined in the appended claims.

I claim as my invention:

1. In a distributing machine of the character described, a wheeled supporting frame, a distributing mechanism pivotally mounted on the forward end of said frame, means to raise and lower said distributing mechanism, and means to swing the same around to different angles.

2. In a distributing machine a wheeled supporting frame, a distributing mechanism pivotally mounted on said frame, a raising and lowering lever operatively connected to said distributing mechanism whereby said mechanism is raised and lowered and held at the desired elevation, means to hold said lever in adjusted position and means connected to said distributing mechanism operable to swing said mechanism around to different angles in a horizontal plane.

3. A distributing machine of the character described comprising a pair of handle bars, a supporting wheel revolubly mounted in the forward end of said bars, a platform arranged on said handle bars, a distributing mechanism pivotally connected to the forward end of said handle bar, a raising and lowering lever operatively connected to said distributing mechanism whereby the same is raised and lowered and held at the desired elevation, means to hold said lever in adjusted position, an operating rod connected to said distributing mechanism whereby the same may be swung around to different angles, and an operating lever connected to the rear end of said rod and arranged within convenient reach of the operator.

4. A distributing mechanism of the character described comprising a pair of handle bars, a supporting wheel journaled in the forward end of said bars, a distributing mechanism comprising a pair of right angularly formed side bars pivotally mounted on the axle of the supporting wheel, a fifth wheel arranged on the forward end of said bars, a hopper supporting bar secured to the upper member of said fifth wheel, hoppers arranged on the opposite ends of said bars, perforated distributing cylinders secured to the lower ends of said hoppers, an agitating shaft revolubly mounted in said cylinders, agitating blades arranged on the ends of said shafts and adapted to force powder through the perforations in said cylinders, and means connected with the supporting wheel whereby said agitating shaft and blades are operated.

5. A distributing mechanism of the character described comprising a pair of handle bars, a supporting wheel journaled in the forward end of said bars, a distributing mechanism comprising a pair of right angularly formed side bars pivotally mounted on the axle of the supporting wheel, a fifth wheel arranged on the forward end of said bars, perforated distributing cylinders secured to the lower ends of said hoppers, an agitating shaft revolubly mounted in said cylinders, agitating blades arranged on the ends of said shafts and adapted to force powder through the perforations in said cylinders, a bearing frame arranged above said hopper supporting bar, a drive shaft loosely mounted in said frame geared to said agitator shaft, a friction gear fixedly mounted on said drive shaft, a counter-shaft revolubly mounted in said bearing frame and geared to the axle of said supporting wheel, a friction gear mounted on said counter-shaft, a shifting rod connected to one end of said drive shaft whereby the latter is shifted to bring the friction gear thereon into operative engagement with the friction gear on said counter-shaft, and means to operate said shifting rod.

In testimony whereof I have hereunto set my hand in presence of two subscribing witnesses.

NICK MERONEK.

Witnesses:
ANTONI MERONEK,
JOSEPH ZIOLKOWSKI.

---

Copies of this patent may be obtained for five cents each, by addressing the "Commissioner of Patents, Washington, D. C."